March 6, 1962    A. L. CAVALIERI, JR., ETAL    3,024,429
ELECTROMECHANICAL REED SYSTEM
Original Filed May 29, 1953
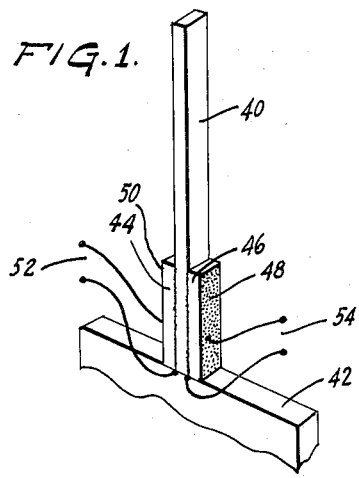
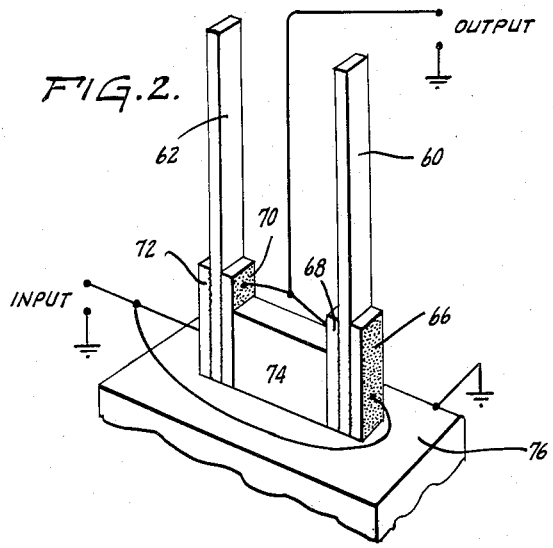
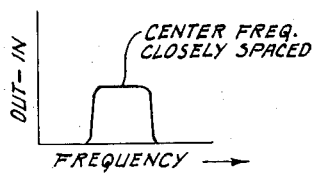
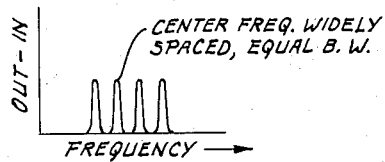
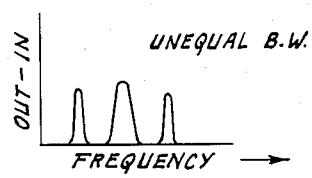
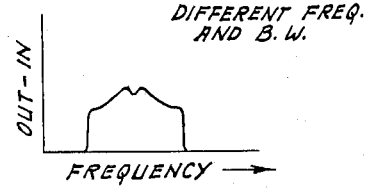
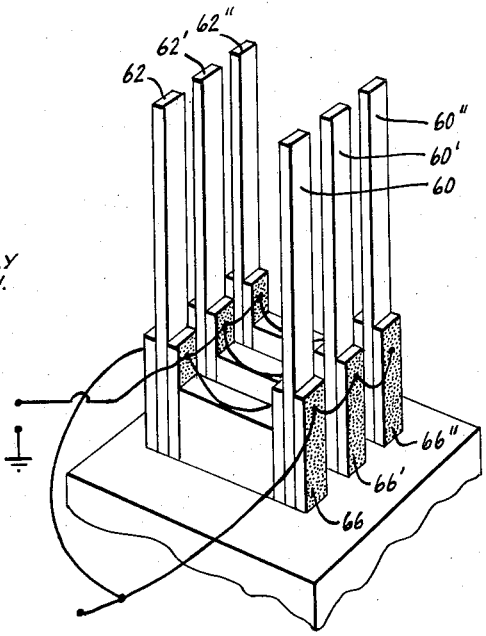
INVENTORS
ALBERT L. CAVALIERI, JR.
ROBERT W. ROOP
BY
Robert D. Sanborn
ATTORNEY United States Patent Office 3,024,429
Patented Mar. 6, 1962

3,024,429
ELECTROMECHANICAL REED SYSTEM
Albert L. Cavalieri, Jr., Hatboro, Pa., and Robert W. Roop, Sewell, N.J., assignors, by mesne assignments, to Philco Corporation, Philadelphia, Pa., a corporation of Delaware
Original application May 29, 1953, Ser. No. 358,286, now Patent No. 2,875,353, dated Feb. 24, 1959. Divided and this application Jan. 14, 1959, Ser. No. 786,832
4 Claims. (Cl. 333—72)

This application is a division of our copending application Serial No. 358,286, filed May 29, 1953, now Patent No. 2,875,353.

This invention relates to frequency sensitive electromechanical systems, and more particularly to electromechanical systems employing a vibratory reed as the frequency sensitive element.

It is well known that a reed comprising an elongated strip of elastic material rigidly supported at one end may be caused to vibrate by the application thereto of a periodic excitation having a frequency in the vicinity of the natural resonant frequency of the reed. The amplitude of the vibration, that is the maximum displacement of the free end of the reed measured from the rest position, is a function of many variables including the constants of the reed, the amplitude of the exciting signal and the difference between the frequency of the exciting signal and the natural frequency of the reed.

One relationship between the amplitude of vibration of the reed and the frequency of the exciting signal is known as the bandwidth of a reed. The bandwidth of a reed is defined as the frequency interval between the exciting frequency below the resonant frequency of the reed and the exciting frequency above the resonant frequency of the reed, both of which cause an amplitude of vibration equal to .707 times the amplitude of vibration caused by an exciting signal of the same amplitude having a frequency equal to the resonant frequency of the reed. It will be recognized that the term "bandwidth," as applied to a reed, has a meaning closely analogous to that of the term "bandwidth" as applied to a resonant resistor-inductor-capacitor circuit. It is also known that, by proper choice of material and dimensions, reeds may be constructed which have a bandwidth that is very small compared to the resonant frequency. The quality factor or Q is the ratio of the energy stored in the vibrating reed system to the energy dissipated per cycle, and is very nearly equal to the ratio of the resonant frequency to the bandwidth for a reed having a high Q. By way of example, it is an easy matter to construct a vibrating reed having a resonant frequency of the order of 250 cycles per second and a bandwidth of a small fraction of one cycle per second.

Frequency meters are now commercially available which employ a bank of high Q reeds, each tuned to a slightly different resonant frequency. The reeds are energized by forming them of a magnetic material and applying the periodic signal to be measured to an electromagnet spaced some distance from the reed bank. The frequency is determined by observing the reeds and noting visually which reed is vibrating with the greatest amplitude. This and other similar vibratory reed systems known to the prior art are subject to several serious disadvantages. The magnetic drive systems, and other drive systems known in the art, are inefficient and difficult to control and are seriously affected by changes in operating temperature, humidity, etc. A second disadvantage is that the output of most prior art reed systems is in the form of a visual indication which cannot be utilized to control an electrical circuit. In certain prior art reed systems, contact points are provided which contact the reed if the amplitude of vibration thereof exceeds a preselected value. Such contact points are difficult to adjust, they provide only a limited amount of output information, and they interfere with the natural vibration of the reed. Attempts have been made to obtain a measurement of the amplitude of vibration by measuring the variation in the capacitance between the free end of the reed and the stationary plate. Such a system is utterly impractical if several reeds of small size are to be mounted within a small volume. These and other disadvantages have limited the usefulness of the vibrating reed type of electromechanical systems.

Therefore it is an object of the present invention to provide a new and improved type of vibrating reed structure.

It is a further object of the invention to provide an improved reed structure in which the input and/or the output are in the form of electrical signals.

It is a further object of the invention to provide a novel electromechanical filter network having an input and/or output in the form of an electrical signal.

These and other objects of the invention are accomplished through the use of a vibratory reed structure comprising one or more elongated vibratory reed elements each having one end thereof secured to a base. The other end of the reed element is free to vibrate at the natural resonant frequency of the reed element. One or more piezoelectric members are secured to each reed element in a region adjacent the fixed end thereof so as to be strained by the vibrations of the reed element. The energizing signal is supplied to, or the output signal is obtained from, electrodes suitably positioned on the piezoelectric material. In certain preferred embodiments of the invention a plurality of piezoelectric members are employed which are mechanically coupled to one another through the vibratory reed element. The reed elements may be employed either singly or in matched pairs with mechanical coupling therebetween, and the individual reed elements or reed element pairs may be assembled in banks.

For a better understanding of the invention together with other and further objects thereof reference should now be made to the following detailed description which is to be read in connection with the accompanying drawing in which:

FIG. 1 is an isometric view of one embodiment of the present invention;

FIG. 2 is an isometric view of a second embodiment of the invention employing two reed elements in a balanced system;

FIG. 3 is an assembly of three reed systems of the type shown in FIG. 2; and

FIGS. 4A–4D are plots showing a few of the many characteristics obtainable with the assembly shown in FIG. 3.

The embodiment of the invention shown in FIG. 1 comprises a reed element 40 which is formed integrally with or is rigidly fastened to a base 42. Reed element 40 may be formed of any material having a relatively high modulus of elasticity and relatively low internal losses. The length, thickness, and stiffness of the material should be selected in accordance with conventional engineering practice to give the desired resonant frequency. In the embodiment shown in FIG. 1, reed element 40 may be formed of a magnetic or nonmagnetic material. It is sometimes advantageous, for reasons that will appear presently, to form reed element 40 of a non-conducting material such as glass. Two members 44 and 46, formed of piezoelectric material, are bonded to reed element 40 adjacent the fixed end thereof. Barium titanate and Rochelle salt are two materials known to exhibit a suitable piezoelectric effect. Barium titanate is suggested as a preferred choice of material in most instances. Barium titanate is made to exhibit the piezoelectric effect by first forming the material in the desired shape, for example in the shape of members 44 and 46, applying suitable electrodes to two faces of the block, polarizing the barium titanate by applying a D.C. voltage to the two electrodes while the block is held at a temperature above the Curie point of the material, and then allowing the material to cool below the Curie point before removal of the polarizing potential.

The bonding of members 44 and 46 to reed element 40 may be accomplished by the use of a thermosetting bonding material which is characterized by having low shrinkage during curing. Araldite Powder, manufactured by the Ciba Company, is a suitable example. In constructing the embodiment shown in FIG. 1 it may be desirable to polarize members 44 and 46 after assembly since the heat necessary to fire the electrodes and to bond members 44 and 46 and element 40 might cause depolarization of members 44 and 46. Members 44 and 46 are provided with conductive area electrodes, such as fired platinum electrodes, on the exposed vertical faces 48 and 50. The faces of members 44 and 46 which are in contact with reed element 40 are also provided with conductive area electrodes. If reed element 40 is formed of a conductive material, and members 44 and 46 are in electrical contact therewith (which will be the case if a conductive bonding agent is employed), then reed element 40 will serve as the second area electrode for members 44 and 46. The advantage of employing a nonconductive reed or a nonconducting bonding agent is that, in this form of construction, members 44 and 46, which form portions of the input and output circuits, respectively, are electrically isolated. Leads 52 are connected to the two conductive electrodes on member 44, and leads 54 are connected to the conductive electrodes on member 46. Members 44 and 46 are polarized in the direction of a line joining the two faces but the polarization of the two members 44 and 46 may be in the same or opposite directions. The neutral axis of the reed structure shown in FIG. 1 lies somewhere within reed element 40 if members 44 and 46 are of approximately equal thickness. It is desirable to form these two members with substantially the same dimensions in order to preserve the symmetry of the vibrating system. Members 44 and 46 are shown as having a rectangular form, but the invention is not to be limited to this particular configuration. In some instance it may be desirable to taper members 44 and 46 and/or reed element 40 to provide a more uniform straining of members 44 and 46. Alternatively, it would be possible to form reed element 40 with an elliptical cross-section and members 44 and 46 with a crescent shaped cross-section. Many other configurations will occur to those skilled in the art of designing reed systems.

The operation of the system shown in FIG. 1 will now be explained. An energizing signal is supplied to leads 52. This signal will stress member 44 but no substantial movement of reed element 40 will result unless the energizing signal has a component at a frequency which is substantially equal to the resonant frequency of the reed system. If reed element 40 is not set into vibration, no signal appears between output leads 54. However, if the energizing signal supplied to leads 52 has a component at a frequency equal to the resonant frequency of reed element 40, the periodic stresses applied to reed element 40 by member 44 will cause reed element 40 to vibrate. If reed element 40 is caused to vibrate, these vibrations will strain member 46 and an output signal will appear between leads 54. The amplitude of this output signal will be a function of the amplitude of the vibration of reed element 40 which is, in turn, a function of the amplitude of the input signal, and the difference in frequency between the frequency of the component causing excitation and the resonant frequency of the reed system. It should be remembered that, in any instance where an applied potential causes a strain in a piezoelectric member, a corresponding strain resulting from an externally applied stress will cause a potential to appear at the points where the potential was formerly applied. Therefore, throughout the specification and claims, any piezoelectric member described as a means for deriving a signal from a reed system may also be employed to supply energy to the reed system.

FIG. 2 illustrates a preferred form of the invention which employs two reed elements 60 and 62 arranged in a balanced system. Reeds 60 and 62 preferably have substantially the same dimensions and identical resonant frequencies. Piezoelectric members 66 and 68 are secured to opposite sides of reed element 60 in the plane of motion of this reed, and piezoelectric members 70 and 72 are secured to opposite sides of reed element 62. Reed elements 60 and 62 are mechanically coupled by a block 74, of material having a high modulus of elasticity, which is disposed therebetween and bonded to piezoelectric members 68 and 70. The whole assembly just described is secured to base 76 in any suitable manner. The mechanical coupling afforded by block 74 causes reed elements 60 and 62 to vibrate 180° out of phase like the arms of a tuning fork. Members 68 and 70 have their exposed faces polarized alike so that like charges appear on these faces. Therefore members 68 and 70 may be connected in parallel as shown in FIG. 2. Similarly members 66 and 72 may be connected in parallel as shown. Various modifications of the system shown are possible. The polarization of members 66 and 68 may be reversed and members 66 and 70 and 68 and 72 connected in parallel. Obviously, members 68 and 70 shown in FIG. 2 may be connected to the input terminals of the system and thus serve as the driving members of the system, in which case members 66 and 72 would be connected to the output terminals. In the embodiment shown in FIG. 2, members 66 and 72 may differ in size or shape from members 68 and 70 without destroying the symmetry of the system. This makes it possible to design one pair of piezoelectric members to give maximum efficiency as driving elements, and the other pair to give maximum efficiency as output coupling elements. In an alternative form of the invention, block 74 may be secured directly to, or be formed integrally with, reed elements 60 and 62. In this form of the invention, members 68 and 70 may be secured to reed elements 60 and 62 in a position above block 74. Since reed elements 60 and 62 are mechanically coupled through block 74, one pair of piezoelectric members, for example members 66 and 68, may be omitted. However, this destroys the symmetry of the system and removes many of the advantages of the balanced system. The chief advantages of the balanced system are lower impedance because of the parallel connection of the piezoelectric members, less coupling to base 76 because of the 180° phase difference in the vibrations of reed elements 60 and 62, and reduced shock excitation of reed elements 60 and 62 due to shocks imparted to base 76 from external sources. The reduced shock excitation is due to the fact that any jarring of base 76 excites reed elements 60 and 62 in phase causing equal and opposite signals to appear on the exposed faces of members 68 and 70. The parallel connection of blocks 68 and 70 causes the signal appearing on one block, due to shock excitation, to cancel the corresponding signal on the other block. The lower coupling to base 76 permits a less massive base to be employed and allows systems of the type shown in FIG. 2 to be assembled into banks of closely spaced systems without appreciable mutual coupling therebetween.

FIG. 3 shows an electromechanical system employing three pairs of reed elements 60—62, 60′—62′ and 60″—62″. Each of these pairs may be tuned to the same or to slightly different resonant frequencies. Members 66, 66' and 66" are shown connected in parallel as are the other piezoelectric members corresponding to members 68, 70 and 72 in FIG. 2. The system shown in FIG. 3 will not be described in detail since the operation thereof is believed to be obvious from the foregoing detailed description of the present invention. One point should be noted, however—namely, that it is not necessary that the output piezoelectric elements be polarized alike or connected in parallel in the manner shown unless it is desired to construct a simple filter having a single flat passband. Furthermore, the reed element pairs in different systems in the bank may have different bandwidths to facilitate shaping of the composite passband.

FIGS. 4A through 4D show the passbands which may be obtained by suitable combination of the novel reed systems described above. It should be remembered that the systems having any one of these passbands may have both an electrical input and an electrical output, that the systems are relatively easy and inexpensive to construct and occupy only a very few cubic inches of space even at audio frequencies. Obviously it is impossible to duplicate these results with conventional capacitor-inductor networks or known forms of reed systems.

So far no mention has been made of the limits of frequency operation of the present invention. Again it is both difficult and undesirable to set precise limits since the development of new materials for the reed elements or the piezoelectric members might extend the range of operation beyond present limits. However, it can be safely stated that the reed system shown may be constructed of presently available materials to cover the range from subaudible frequencies to frequencies of the order of several kilocycles per second.

While there have been described what are at present considered to be the preferred embodiments of the invention and the manner in which the same are to be used, it is recognized that other and further modifications of the invention are possible which fall within the spirit and scope of the hereinafter appended claims.

What is claimed is:

1. A frequency sensitive electromechanical system comprising first and second substantially identical elongated reed elements, each of said reed elements having a cross-section having a longer and a shorter transverse axis, a base member, each of said first and second reed elements being individually and rigidly secured at a first extreme end thereof directly to said base member, said reed elements being disposed in spaced juxtaposition with the longitudinal axes and the shorter transverse axes thereof in a common plane, first and second substantially identical piezoelectric members secured to each of said reed elements in positions adjacent said first ends, said first and second piezoelectric members being positioned substantially at opposite ends of said shorter transverse axis of the reed element with which they are associated, said piezoelectric members being formed with electrodes thereon to which an electrical signal may be supplied to and derived from piezoelectric members, and means mechanically coupling said first reed element to said second reed element, said mechanical coupling means comprising a block of material having a high modulus of elasticity fitted between and mechanically secured to the adjacent faces of the two centrally disposed ones of the four abovementioned piezoelectric members.

2. A frequency sensitive electromechanical system comprising a base member, first and second substantially identical reed elements, each of said reed elements being individually and rigidly secured at a first extreme end thereof directly to said base member, said reed elements being disposed in spaced juxtaposition and arranged to vibrate in a common plane, each of said reed elements having first and second piezoelectric members secured to the sides thereof at positions adjacent said first end thereof, said two piezoelectric members associated with each reed element being positioned so as to be oppositely strained by vibrations of said reed element, said piezoelectric members being formed with electrodes thereon in regions which undergo changes in potential in response to preselected straining thereof, said first and second reed elements being so disposed that a face of one piezoelectric member associated with the first reed element is adjacent face of a piezoelectric member associated with said second reed element, and means mechanically coupling said first reed element to said second reed element, said mechanical coupling means comprising a block of material having a high modulus of elasticity fitted between and mechanically secured to said two adjacent faces of said piezoelectric members.

3. A frequency sensitive electromechanical system as in claim 2, said system further comprising means electrically connecting one of said piezoelectric members associated with said first reed element in shunt with one of said piezoelectric members associated with said second reed element, and means electrically connecting the other of said piezoelectric members associated with said first reed element in shunt with the other of said piezoelectric members associated with said second reed element.

4. An electrical filter circuit comprising a plurality of frequency sensitive electromechanical systems, each system comprising a base member, first and second substantially identical reed elements, each of said reed elements being individually and rigidly secured at a first extreme end thereof directly to said base member, each of said reed elements having first and second piezoelectric members secured to the sides thereof at positions adjacent said first end thereof, said two piezoelectric members associated with each reed element being positioned so as to be oppositely strained by vibrations of said reed element, said piezoelectric members being formed with electrodes thereon in regions which undergo changes in potential in response to preselected straining thereof, said reed elements being disposed in spaced juxtaposition and arranged to vibrate in a common plane, said reed elements being further disposed so that a face of one of the piezoelectric members associated with said first reed element is adjacent face of one of said piezoelectric members associated with said second reed element, means mechanically coupling said first reed element to said second reed element, said mechanical coupling means comprising a block of material having a high modulus of elasticity fitted between and mechanically secured to said adjacent faces of said piezoelectric members, means connecting each electrode of each frequency sensitive electromechanical system to the corresponding electrode in each other frequency sensitive electromechanical system, thereby to connect corresponding piezoelectric members in various frequency sensitive electromechanical systems in shunt with one another, the reed elements in different electromechanical systems being resonant at different frequencies.

References Cited in the file of this patent

UNITED STATES PATENTS

| | | |
|---|---|---|
| 1,693,806 | Cady | Dec. 4, 1928 |
| 2,081,405 | Mason | May 25, 1937 |
| 2,185,966 | Pfanstiehl | Jan. 2, 1940 |
| 2,666,196 | Kinsley et al. | Jan. 12, 1954 |
| 2,769,867 | Crownover et al. | Nov. 6, 1956 |